April 10, 1962 H. L. DOBRIKIN ET AL 3,028,842
PARKING BRAKE CHAMBER
Filed April 21, 1960 3 Sheets-Sheet 1

INVENTORS.
HAROLD L. DOBRIKIN
VICTOR MASTIS
BY Parker & Carter
Attorneys.

INVENTORS.
HAROLD L. DOBRIKIN
VICTOR MASTIS
BY Parker & Carter
Attorneys.

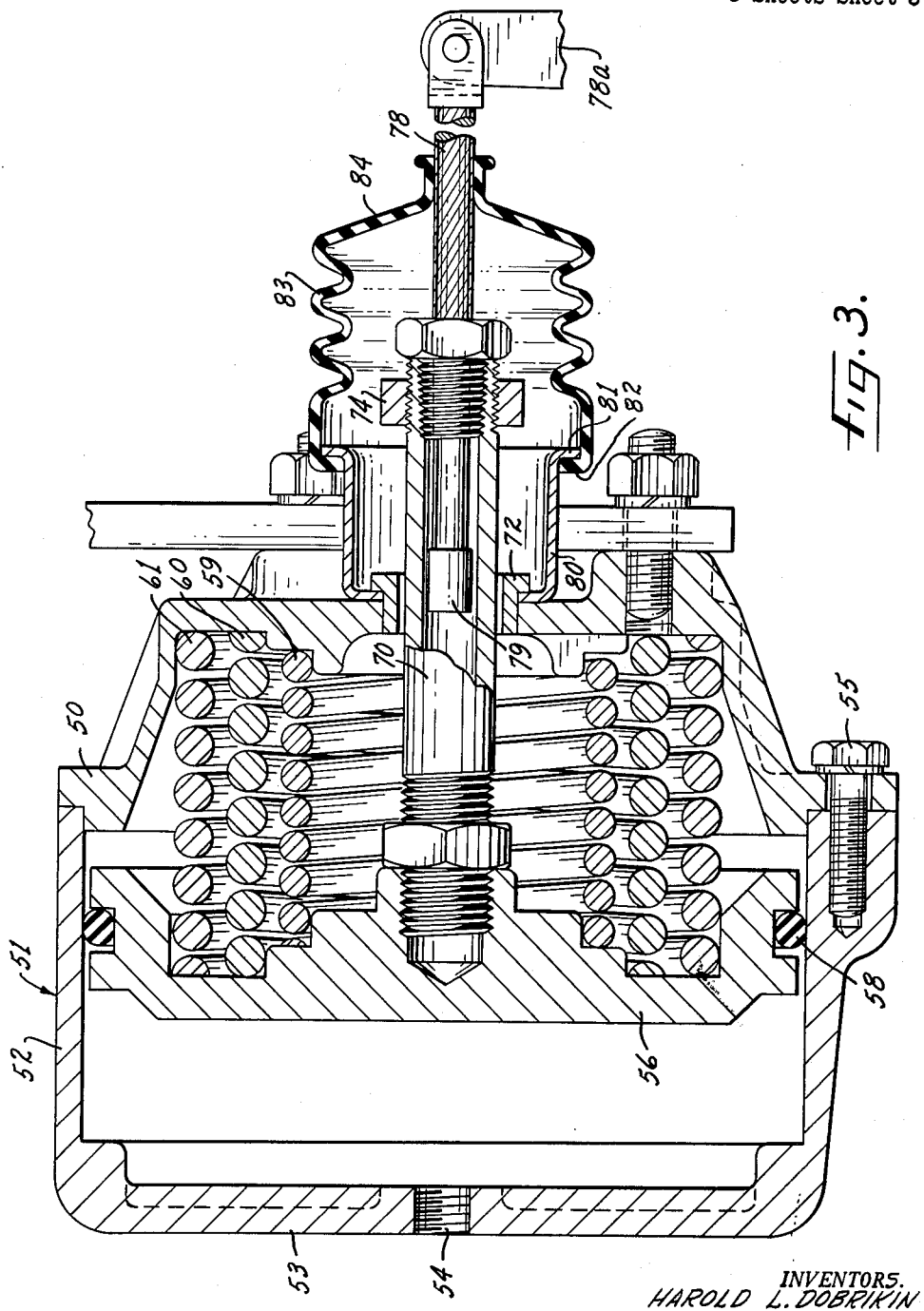

United States Patent Office 3,028,842
Patented Apr. 10, 1962

3,028,842
PARKING BRAKE CHAMBER
Harold L. Dobrikin, Highland Park, and Victor Mastis, Chicago, Ill., assignors to Berg Airlectro Products Co., Chicago, Ill., a corporation of Illinois
Filed Apr. 21, 1960, Ser. No. 23,846
7 Claims. (Cl. 121—38)

This invention relates to cylinder and piston arrangements and particularly to a parking brake chamber comprising a cylinder, a piston movable therein and a means for transmitting the motion of said piston.

One purpose of the invention is to provide a means for transmitting motion of said piston which enables the chamber encompassing said piston to be placed at a variety of locations.

Particularly in relation to its employment in vehicles, specifically trucks and trailer trucks, the location and positioning of such a parking brake chamber has in the past raised substantial difficulties. Since the connection of the piston to other elements on the truck has been universally constituted by a rigid member, normally a rod, various mechanisms have been required in order to direct the transmission of force or motion of the piston to the desired point on the truck. This has further complicated the positioning and location of the parking brake chamber and has required the employment of uneconomical elements.

Accordingly, it is one purpose of the present invention to provide a flexible means for transmitting the motion of the piston in a parking chamber.

Another purpose is to provide an emergency parking chamber having a particularly effective yielding means enclosed within a minimum spacial area.

Another purpose is to provide an emergency parking brake chamber having elements effective to retain movable parts thereof when said chamber is disassembled.

Another purpose is to provide an emergency parking brake chamber having a particularly effective lost-motion connection with elements operable thereby.

Other purposes will appear from time to time during the course of the specification and claims.

This application is a continuation-in-part of application Serial No. 767,994, filed October 17, 1958, and entitled "Parking Brake Chamber," now Patent No. 2,970,572.

We illustrate our invention more or less diagrammatically in the accompanying drawings wherein:

FIGURE 3 is a view similar to that of FIGURE 2 and illustrating the parts in another position.

Like parts are indicated by like numerals throughout the specification and drawings.

Figure 1:
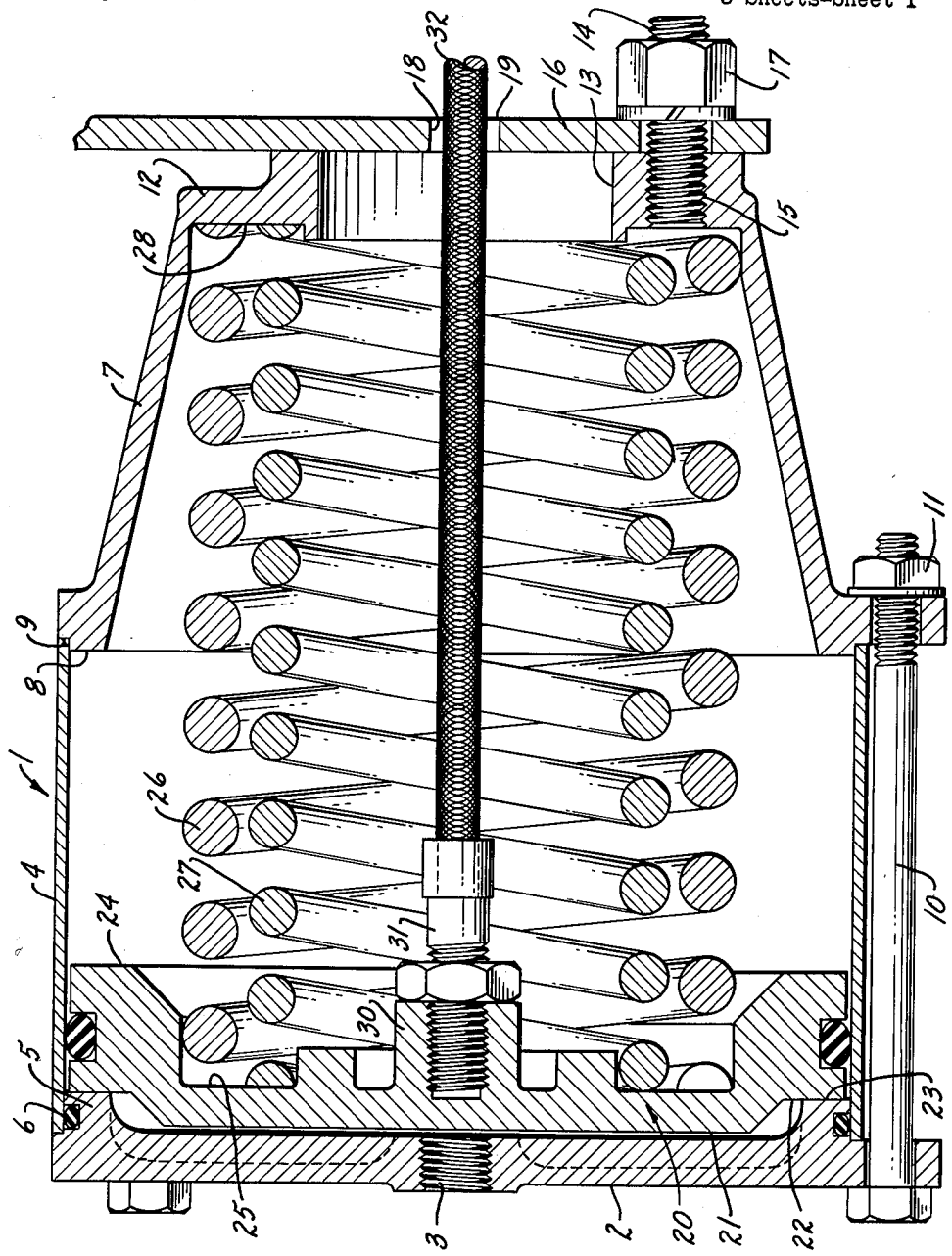
FIGURE 1 is a side elevation in partial cross section and illustrating our invention.

Referring now to FIGURE 1 of the drawings, the numeral 1 generally indicates a housing. The housing 1 may be comprised of a forward wall 2 carrying a centrally positioned inlet aperture 3 which may be threaded, for example, to permit the attachment of a suitable source of fluid pressure supply. A cylindrical wall 4 may have one of its open ends held in abutting relationship against and surrounding an inwardly directed flange 5 on the wall 2, the wall 4 and the flange 5 being sealed by any suitable sealing means, such as the ring 6. Illustrated at 7 is a rear housing element having an inwardly directed flange 8 held in abutting relationship against and within the opposite open end of the wall 4, as illustrated at 9. Clamping means, such as the bolt 10 and nut 11 extend between the housing portions 2 and 7 to clamp the wall 4 therebetween. The portion 7 has an inwardly directed annular flange 12 defining a comparatively large aperture 13. Suitable connecting means, such as the stud 14, may be threadedly engaged with portions of the flange 12, as indicated at 15 and may extend through the wall of an attaching wall portion 16 to be secured by the nut 17 on the opposite side of the wall 16 and thus to hold the housing or chamber 1 in position. The wall 16 may have an aperture 18 with rounded edges, such as those indicated at 19.

A piston 20 has one flat outer surface 21 opposed to the inlet 3. The surface 21 may have an annular recess, as indicated at 22, to provide a ledge or perimetrical surface positioned to engage the inwardly directed surface 23 of flange 5 on wall portion 2.

The opposite surface 24 of the piston 20 has formed therein an annular groove 25 in which seat a pair of springs 26, 27. The spring 26 is of substantially larger size than the spring 27 and surrounds the latter. Both springs 26 and 27 extend longitudinally through the housing or chamber 1 and have their opposite ends seated upon or bearing against an inner face 28 of the flange portion 12.

A centrally positioned well 30 on the inner wall 24 of piston 20 receives a fitting 31. A flexible cable 32 is secured to the fitting 31 and extends longitudinally, axially through the housing 1 and the springs 26, 27, the aperture 13 and the aperture 18. It will be understood that the opposite end of the flexible cable 32 is secured to the element to which the motion of the piston 20 is desired to be transmitted. Since the cable 32 is flexible, it may be wound about any desirable mechanism, such as pulleys and the like, to be brought to the desired point of application of the motion of piston 20 produced by springs 26, 27. Thus the chamber 1 may be positioned at almost any desirable point on the truck or vehicle or other device to which the chamber is applicable, without the necessity for considering the difficulties raised by the employment of a rigid rod for the purpose of transmitting the motion or force of piston 20.

Figure 2:
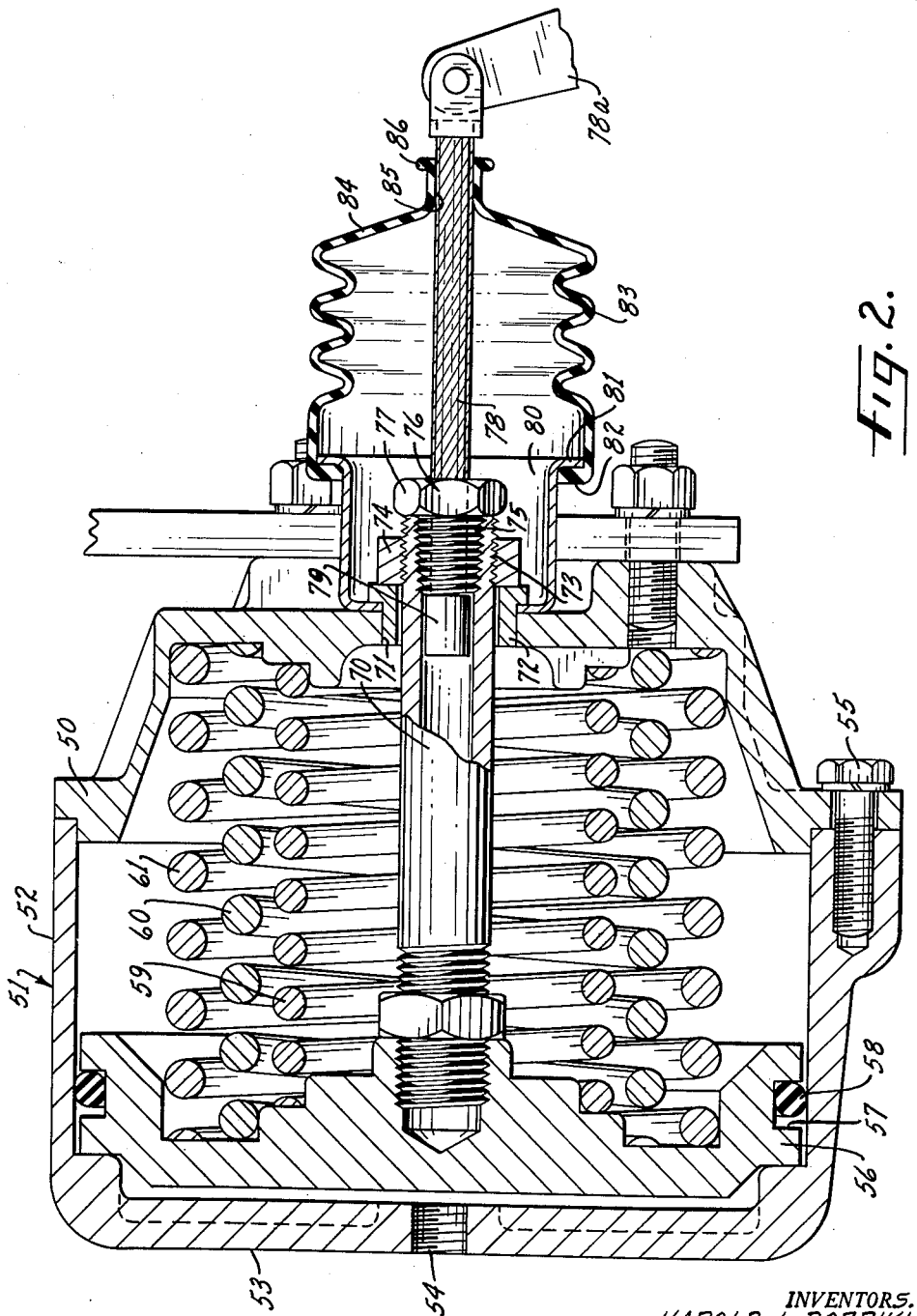
FIGURE 2 is a side elevation in cross section illustrating a variant form of our invention.

Referring now to FIGURE 2, the numeral 50 designates an end bell or closure for a main cylindrical housing portion 51 having a cylindrical wall 52 and an end wall 53 apertured as at 54 to provide for a fluid pressure inlet. The housing 51 may be secured to end bell 50 by any suitable securing means such as the bolts, one of which is indicated at 55.

Reciprocally mounted within the housing 51 is a piston 56 having a circumferential groove 57 in which a seal 58 rides for sealing engagement with the inner surface of wall 52.

A set of three coaxial yielding members of differing strength are positioned in housing 51 and have their opposite ends in contact with the inner surface of the end wall of bell 50 and appropriately formed annular surfaces on the opposed face of piston 56, the said means being illustrated as spirally coiled, circumferential springs 59, 60 and 61. It will be observed that the springs 59, 60 and 61 are formed of material having increasing cross-sectional diameters and are arranged co-axially in individual springs of increasing diameters in relation to each other.

Secured to and extending axially from the face of piston 56 against which the springs 59, 60 and 61 are exerted, is a partially hollow shaft 70. The shaft 70 extends through an aperture 71 in the end wall of cap 50 in which bushing 72 is positioned for slidable reception of shaft 70. The outer end of shaft 70 is threaded as at 73 and threadably receives an abutment head 74. The threaded outer end 73 of shaft 70 is inwardly threaded as at 75 to receive a tubular bolt 76 having an enlarged apertured head 77. Extending into shaft 70, through the bore of member 76, is a flexible cable 78 having an enlargement 79 secured to the inner end thereof for slidable movement within the hollow portion of shaft 70, the diameter of head 79 being only slightly less than the inner diameter of shaft 70 and larger than the bore in member 76.

A dust cap 80 is secured to the outer surface of end cap 50 and surrounds the outer flanged portion of bushing 72, the outwardly extending portion of shaft 70, the member 76, and the abutment member 74 when the parts are in the position illustrated in FIGURE 2. A flexible dust sleeve is secured in any suitable manner, as by the engaging flanges 81 of members 80 and 82 of the flexible dust shield 83, the same being formed, for example, of rubber-like material. The member 83 has a conical end wall 84 centrally apertured as at 85 and an axially extending sleeve 86 of a diameter equal to the aperture 85 engaging and receiving the flexible cable 78. It will be understood that the cable 78 extends to and is secured, in any suitable manner, to suitable brake mechanism such as the slack adjuster arm normally employed in truck or vehicle braking systems and illustrated in part at 78a.

In operation, fluid pressure is maintained, through inlet 54, within housing 51, between piston 56 and end wall 53, the same holding piston 56 to the right, as the parts are shown in FIGURE 2, or inwardly within housing 51, against the action of and compressing springs 59, 60, and 61 as shown in FIGURE 3. In this position, the shaft 70 extends outwardly a substantial distance from housing end cap 50, and cable head or enlargement 79, is thus moved inwardly in shaft 70 toward piston 56 a substantial distance. The cable 78 is free to move within the hollow portion of shaft 70 so that the normal operation of the slack adjuster arm 78a to which cable 78 is connected is freely permitted.

Upon loss or release of pressure from the housing 51 between piston 56 and end wall 53, the springs 59, 60, and 61 are effective to move piston 56 toward wall 53 and into the position illustrated, for example, in FIGURE 2. In so doing, the shaft 70 and end member 76 are similarly moved to the left, as the parts are illustrated in the drawings. This action causes the inner end of member 76 initially to operatively engage the enlargement 79 in cable 78 and to draw the cable 78 into the position illustrated in FIGURE 2 and thus to apply, through the means connected to the opposite end of cable 78, the brakes of the vehicle.

The arrangement of members 70—79 is such that the housing 51 may be removed from end bell 50 with complete freedom for replacement of seals 58 or for other repairs. In such event, the cable 78, by means of enlargement 79 and member 76, is effective to retain the piston 56 in a retracted position against the action of springs 59, 60, 61 when arm 78a is in a position such as that shown in FIGURE 3 and the limit abutment 74 provides a final stop means when the parts are as illustrated in FIGURE 2, retaining the springs 59, 60, and 61 in the position illustrated in FIGURE 2. Except for such arrangement, it is clear that removal of housing 51 would free the springs 59, 60, and 61 to, in effect, "explode" outwardly, causing loss of parts and possible injury to maintenance personnel.

Although an operative form of the device has been shown, the invention is not limited to the particular details shown. Many changes may be made in the form, shape and arrangement of parts without departing from the spirit of the invention. For example, whereas there is shown a substantially reduced aperture 18 in the wall member 16, it will be realized that the aperture 18 could be of a variety of sizes, dependent upon the positioning and direction of the cable 32 beyond the chamber 1.

We claim:

1. A parking brake chamber comprising a cylindrical housing, an air pressure inlet in one end wall of said housing, a piston reciprocal within said housing, a plurality of co-axially arranged, spiral springs operative against the opposite end wall of said housing and against the face of said piston opposed to said opposite end wall, said springs being of differential strengths, a hollow shaft secured to said face of said piston and extending outwardly through said opposite end wall of said housing, an apertured head secured to said shaft outside said housing, a flexible cable extending through said apertured head and into said shaft, said cable having an enlargement slidably positioned within said shaft and having a diameter greater than the aperture in said head.

2. The structure of claim 1 characterized by and including an abutment member adjustably secured to the outer end of said shaft outside said housing and positioned to abut an outer surface of said opposite end of said housing to limit movement of said piston responsive to the action of said springs.

3. In a cable actuating mechanism, a cup-shaped housing, a closure wall for said housing, said housing having a cylindrical wall and a bottom wall spaced from said closure wall, a fluid pressure inlet in said bottom wall, a piston reciprocal within said housing and having a surface opposed to said bottom wall, yielding means operatively engaging the opposite surface of said piston and the inner surface of said closure wall, said housing being removably secured to said closure wall, a hollow shaft secured to said piston and extending axially therefrom through said closure wall, an end member removably secured to the outer end of said shaft outside said housing, said end member having an axial bore axially aligned with said shaft, a flexible cable extending through said bore and having an enlargement slidably positioned within said shaft and having a diameter larger than the inner diameter of said bore.

4. In combination, a housing, a piston movable in said housing, a pressure inlet in a wall of said housing on one side of said piston, yielding means positioned in said housing to urge said piston toward said inlet, a hollow shaft on the opposite side of said piston and extending outwardly of said housing, a fitting secured to said shaft outside said housing and having a bore communicating with the area within said shaft, a flexible member extending through said bore into said area and an abutment carried in said area by said flexible member, said abutment having an outer dimension greater than the diameter of said bore.

5. In combination, a housing, a piston reciprocable in said housing, yielding means for urging said piston in one direction, a hollow shaft secured to said piston and extending co-axially therefrom in the opposite direction, a cap removably secured to the end of said shaft and having a bore co-axial with said shaft, and a flexible cable extending through said bore and carrying slidably within said shaft an abutment having a lateral dimension greater than the diameter of said bore.

6. In combination, a housing, a piston reciprocal therein, a plurality of co-axially positioned coiled springs of varying diameters having their opposite ends in contact with one side of said piston and an opposed inner surface of said housing, a hollow shaft extending co-axially with said piston and said springs and through said springs and a flexible cable having a unidirectionally operative connection with said shaft, said cable extending outwardly from said housing in a direction opposite from that in which said piston is urged by said springs, said connection being effective to retain said piston against movement outwardly of said housing in the direction in which it is urged by said springs.

7. In combination, a housing, a piston reciprocal in said housing, yielding means in said housing and positioned to urge said piston in one direction therewithin, a hollow piston shaft secured to said piston and extending outwardly from said housing in a direction opposite that toward which said piston is urged by said yielding means, a head slidable in said hollow shaft, a bore adjacent the end of said hollow piston shaft opposite that end of said shaft which is secured to said piston, said bore having a diameter smaller than said head, and a member secured to said head and extending through said bore outwardly from said shaft in a direction opposite from that in which said piston is urged by said yielding means.

References Cited in the file of this patent

UNITED STATES PATENTS

| | | |
|---|---|---|
| 364,646 | Hanson | June 14, 1887 |
| 2,597,917 | Bent | May 27, 1952 |
| 2,640,368 | Schjolin | June 2, 1953 |